(12) United States Patent
Mallik et al.

(10) Patent No.: US 8,855,000 B2
(45) Date of Patent: Oct. 7, 2014

(54) INTERFERENCE ESTIMATION USING DATA TRAFFIC POWER AND REFERENCE SIGNAL POWER

(75) Inventors: Siddhartha Mallik, San Diego, CA (US); Tao Luo, San Diego, CA (US); Taesang Yoo, San Diego, CA (US); Yongbin Wei, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 151 days.

(21) Appl. No.: 13/455,906

(22) Filed: Apr. 25, 2012

(65) Prior Publication Data

US 2012/0327795 A1    Dec. 27, 2012

Related U.S. Application Data

(60) Provisional application No. 61/480,288, filed on Apr. 28, 2011.

(51) Int. Cl.
*H04W 24/06* (2009.01)
*H04B 17/00* (2006.01)

(52) U.S. Cl.
CPC .................. *H04B 17/005* (2013.01)
USPC ........................................ 370/252

(58) Field of Classification Search
CPC ..... H04W 24/02; H04W 24/08; H04B 17/005
USPC ........... 370/241.252, 241, 252; 375/316, 346
See application file for complete search history.

(56) References Cited

U.S. PATENT DOCUMENTS

| 5,936,979 | A | 8/1999 | Jyrkkae |
| 6,574,456 | B2 | 6/2003 | Hamabe |
| 6,839,333 | B1 | 1/2005 | Akerberg |
| 6,907,270 | B1 | 6/2005 | Blanz |
| 6,973,098 | B1 | 12/2005 | Lundby et al. |
| 7,031,753 | B2 | 4/2006 | Hashem et al. |

(Continued)

FOREIGN PATENT DOCUMENTS

| CN | 1438781 A | 8/2003 |
| CN | 1943158 A | 4/2007 |

(Continued)

OTHER PUBLICATIONS

"3rd Generation Partnership Project; Technical Specification Group Radio Access Network; Evolved Universal Terrestrial Radio Access (E-UTRA); Physical layer procedures (Release 9)", 3GPP Standard; 3GPP TS 36.213, 3rd Generation Partnership Project (3GPP), Mobile Competence Centre ; 650, Route Des Lucioles ; F-06921 Sophia-Antipolis Cedex ; France, No. V9.3.0, Sep. 17, 2010, pp. 1-80, XP050442094, [retrieved on Sep. 17, 2010].

(Continued)

*Primary Examiner* — Chi Pham
*Assistant Examiner* — Robert Lopata
(74) *Attorney, Agent, or Firm* — Seyfarth Shaw LLP

(57) ABSTRACT

In a wireless communication system, interference on data tones is estimated by detecting data transmissions from interferers. An overall interference covariance matrix is estimated as a function of scalar traffic to pilot ratio (TPR) estimates, residual interference covariance estimates, and covariance of channel estimates of dominant interferers. The interference estimates are refined as a function of reliability based on a ratio of power received from a serving cell and power received from a dominant interferer.

19 Claims, 10 Drawing Sheets

(56) References Cited

U.S. PATENT DOCUMENTS

| | | | |
|---|---|---|---|
| 7,184,497 B2* | 2/2007 | Jeske et al. | 375/346 |
| 7,283,510 B2* | 10/2007 | Ito et al. | 370/346 |
| 7,738,907 B2 | 6/2010 | Xiao et al. | |
| 7,813,311 B2 | 10/2010 | Dick et al. | |
| 7,860,198 B2 | 12/2010 | Montalbano | |
| 7,907,572 B2 | 3/2011 | Yang et al. | |
| 7,944,983 B2 | 5/2011 | Fu et al. | |
| 8,068,785 B2* | 11/2011 | Ahn et al. | 455/63.1 |
| 8,085,875 B2 | 12/2011 | Gore et al. | |
| 8,102,935 B2* | 1/2012 | Akkarakaran et al. | 375/267 |
| 8,107,885 B2 | 1/2012 | Love et al. | |
| 8,121,602 B2 | 2/2012 | Yi et al. | |
| 8,130,849 B2 | 3/2012 | Lincoln et al. | |
| 8,254,911 B1 | 8/2012 | Lee | |
| 8,270,547 B2 | 9/2012 | Panicker et al. | |
| 8,275,408 B2 | 9/2012 | Attar et al. | |
| 8,305,921 B2 | 11/2012 | Narasimhan et al. | |
| 8,385,477 B2* | 2/2013 | Cedergren et al. | 375/340 |
| 8,411,780 B2* | 4/2013 | Jonsson et al. | 375/267 |
| 8,477,603 B2* | 7/2013 | Sambhwani et al. | 370/229 |
| 8,493,942 B2* | 7/2013 | Luo et al. | 370/335 |
| 8,605,771 B2* | 12/2013 | Cairns | 375/147 |
| 8,611,295 B2 | 12/2013 | Song et al. | |
| 8,654,701 B2 | 2/2014 | Kazmi et al. | |
| 2001/0007819 A1 | 7/2001 | Kubota | |
| 2002/0188723 A1 | 12/2002 | Choi et al. | |
| 2003/0016740 A1 | 1/2003 | Jeske et al. | |
| 2003/0125040 A1 | 7/2003 | Walton et al. | |
| 2004/0072579 A1 | 4/2004 | Hottinen | |
| 2006/0121946 A1 | 6/2006 | Walton et al. | |
| 2007/0036179 A1 | 2/2007 | Palanki et al. | |
| 2007/0064655 A1 | 3/2007 | Ruuska | |
| 2007/0081480 A1 | 4/2007 | Cai et al. | |
| 2007/0109989 A1 | 5/2007 | Nakagawa et al. | |
| 2007/0197251 A1 | 8/2007 | Das et al. | |
| 2008/0014958 A1 | 1/2008 | Kim et al. | |
| 2008/0123547 A1 | 5/2008 | Palanki | |
| 2008/0233967 A1 | 9/2008 | Montojo et al. | |
| 2008/0261645 A1 | 10/2008 | Luo et al. | |
| 2009/0135754 A1 | 5/2009 | Yavuz et al. | |
| 2009/0161781 A1 | 6/2009 | Kolze | |
| 2009/0170442 A1 | 7/2009 | Asanuma et al. | |
| 2009/0199055 A1 | 8/2009 | Chen et al. | |
| 2009/0201825 A1 | 8/2009 | Shen et al. | |
| 2009/0238256 A1 | 9/2009 | Onggosanusi et al. | |
| 2009/0247181 A1 | 10/2009 | Palanki et al. | |
| 2009/0252077 A1 | 10/2009 | Khandekar et al. | |
| 2009/0257390 A1 | 10/2009 | Ji et al. | |
| 2009/0316809 A1 | 12/2009 | Chun et al. | |
| 2009/0323616 A1 | 12/2009 | Zeller et al. | |
| 2010/0002664 A1 | 1/2010 | Pan et al. | |
| 2010/0008282 A1 | 1/2010 | Bhattad et al. | |
| 2010/0035555 A1 | 2/2010 | Bala et al. | |
| 2010/0039970 A1 | 2/2010 | Papasakellariou et al. | |
| 2010/0041390 A1 | 2/2010 | Chen et al. | |
| 2010/0048151 A1* | 2/2010 | Hara | 455/115.1 |
| 2010/0067366 A1 | 3/2010 | Nicoli et al. | |
| 2010/0098012 A1 | 4/2010 | Bala et al. | |
| 2010/0106828 A1 | 4/2010 | Palanki et al. | |
| 2010/0111235 A1 | 5/2010 | Zeng et al. | |
| 2010/0182903 A1 | 7/2010 | Palanki et al. | |
| 2010/0195604 A1 | 8/2010 | Papasakellariou et al. | |
| 2010/0202311 A1 | 8/2010 | Lunttila et al. | |
| 2010/0202372 A1 | 8/2010 | Chun et al. | |
| 2010/0214937 A1 | 8/2010 | Chen et al. | |
| 2010/0215075 A1 | 8/2010 | Jonsson et al. | |
| 2010/0216405 A1 | 8/2010 | Bhadra et al. | |
| 2010/0222062 A1 | 9/2010 | Chou et al. | |
| 2010/0226327 A1 | 9/2010 | Zhang et al. | |
| 2010/0227638 A1 | 9/2010 | Park et al. | |
| 2010/0272077 A1 | 10/2010 | Van Rensburg et al. | |
| 2010/0278109 A1 | 11/2010 | Papasakellariou et al. | |
| 2010/0278290 A1 | 11/2010 | Huang et al. | |
| 2011/0013710 A1 | 1/2011 | Xiao | |
| 2011/0032839 A1 | 2/2011 | Chen et al. | |
| 2011/0081917 A1 | 4/2011 | Frank et al. | |
| 2011/0092231 A1 | 4/2011 | Yoo et al. | |
| 2011/0105171 A1 | 5/2011 | Luschi et al. | |
| 2011/0142003 A1 | 6/2011 | Kuchi et al. | |
| 2011/0158211 A1 | 6/2011 | Gaal et al. | |
| 2011/0170514 A1 | 7/2011 | Eriksson et al. | |
| 2011/0177821 A1 | 7/2011 | Senarath et al. | |
| 2011/0206167 A1* | 8/2011 | Rosenqvist et al. | 375/346 |
| 2011/0249643 A1 | 10/2011 | Barbieri et al. | |
| 2011/0250919 A1 | 10/2011 | Barbieri et al. | |
| 2011/0275394 A1 | 11/2011 | Song et al. | |
| 2011/0312319 A1 | 12/2011 | Lindoff et al. | |
| 2011/0312358 A1 | 12/2011 | Barbieri et al. | |
| 2011/0317624 A1 | 12/2011 | Luo et al. | |
| 2012/0003945 A1 | 1/2012 | Liu et al. | |
| 2012/0009959 A1 | 1/2012 | Yamada et al. | |
| 2012/0044818 A1 | 2/2012 | Lindoff et al. | |
| 2012/0076025 A1 | 3/2012 | Barbieri et al. | |
| 2012/0076040 A1 | 3/2012 | Hoshino et al. | |
| 2012/0082197 A1 | 4/2012 | Jonsson et al. | |
| 2012/0092989 A1 | 4/2012 | Baldemair et al. | |
| 2012/0113851 A1 | 5/2012 | Schober et al. | |
| 2012/0190391 A1 | 7/2012 | Yoo et al. | |
| 2012/0201152 A1 | 8/2012 | Yoo et al. | |
| 2012/0263247 A1 | 10/2012 | Bhattad et al. | |
| 2012/0329498 A1 | 12/2012 | Koo et al. | |
| 2013/0039203 A1 | 2/2013 | Fong et al. | |
| 2013/0157675 A1 | 6/2013 | Li et al. | |
| 2013/0301458 A1 | 11/2013 | Barbieri et al. | |

FOREIGN PATENT DOCUMENTS

| | | |
|---|---|---|
| EP | 1337054 A2 | 8/2003 |
| EP | 1735938 A1 | 12/2006 |
| JP | 2007189619 A | 7/2007 |
| JP | 3973017 B2 | 9/2007 |
| JP | 2010016494 A | 1/2010 |
| JP | 2013534778 A | 9/2013 |
| KR | 20080046404 A | 5/2008 |
| KR | 20090132625 A | 12/2009 |
| WO | 03041300 A1 | 5/2003 |
| WO | 2005089004 A1 | 9/2005 |
| WO | 2005099163 A1 | 10/2005 |
| WO | 2006020021 A1 | 2/2006 |
| WO | WO2008082118 A1 | 7/2008 |
| WO | 2009057960 A2 | 5/2009 |
| WO | 2009065075 A1 | 5/2009 |
| WO | 2009099811 A1 | 8/2009 |
| WO | 2009119988 A1 | 10/2009 |
| WO | 2009120934 A1 | 10/2009 |
| WO | WO2009118707 A1 | 10/2009 |
| WO | WO2010002230 A2 | 1/2010 |
| WO | 2010025270 A1 | 3/2010 |
| WO | 2010056763 A2 | 5/2010 |
| WO | 2010058979 A2 | 5/2010 |
| WO | 2010083451 A2 | 7/2010 |
| WO | WO2010074444 A2 | 7/2010 |
| WO | WO2010089408 A1 | 8/2010 |
| WO | 2010103886 A1 | 9/2010 |
| WO | WO2011002389 A1 | 1/2011 |
| WO | 2011130447 A1 | 10/2011 |
| WO | 2011163265 A1 | 12/2011 |
| WO | 2011163482 A1 | 12/2011 |
| WO | WO2012018894 A1 | 2/2012 |

OTHER PUBLICATIONS

CATT: "Considerations on Interference Coordination in Het-Net", 3GPP Draft; R1-100902, 3rd Generation Partnership Project (3GPP), Mobile Competence Centre ; 650, Route Des Lucioles ; F-06921 Sophia-Antipolis Cedex ; France, vol. RAN WGI, No. San Francisco, USA; Feb. 22, 2010, Feb. 16, 2010, XP050418504, [retrieved on Feb. 16, 2010].

CMCC: "Discussion on HeNB related interference scenarios and deployment configurations" , 3GPP Draft; R4-091232, 3rd Generation Partnership Project (3GPP), Mobile Competence Centre ; 650, Route Des Lucioles; F-06921 Sophia-Antipolis Cedex ; France, No. Seoul, Korea; Mar. 30, 2009, XP050342009, [retrieved on Mar. 30, 2009] the whole document.

(56) References Cited

OTHER PUBLICATIONS

Duplicy, J. et al. (Mar. 8, 2011) "MU-MIMO in LTE Systems," EURASIP Journal on Wireless Communications and Networking, Hindawi Publishing Corporation, vol. 2011, Article ID 496763, pp. 1-13, doi: 10.1155/2011/496763.
Hsieh M-H. et al: "Channel Estimation for OFDM Systems Based on Comb-Type Pilot Arrangement in Frequency Selective Fading Channels" IEEE Transactions on Consumer Electronics, vol. '44, No. 1, Feb. 1, 1998, pp. 217-225.
Huawei: "Correction on CQI reporting", 3GPP Draft; R1-091652 36.213 CR238(REL-8,F) Correction on CQI Reporting, 3rd Generation Partnership Project (3GPP), Mobile Competence Centre ; 650, Route Des Lucioles ; F-06921 Sophia-Antipolis Cedex ; France, No. Seoul, Korea; Mar. 28, 2009, XP050339187, [retrieved on Mar. 28, 2009].
Huawei: "CQI Enhancement for Interference Varying Environments", 3GPP Draft; R1-101061 CQI Enhancement for Interference Varying Environments Ver (Final), 3rd Generation Partnership Project (3GPP), Mobile Competence Centre ; 650, Route Des Lucioles ; F-06921 Sophia-Antipolis Cedex ; France, vol. RAN WGI, No. San Francisco, USA; Feb. 22, 2010, Feb. 16, 2010, XP050418632, [retrieved on Feb. 16, 2010].
Huawei: "Enhanced ICIC and Resource-Specific CQI Measurement", 3GPP Draft; R1-101981, 3rd Generation Partnership Project (3GPP), Mobile Competence Centre ; 650, Route Des Lucioles ; F-06921 Sophia-Antipolis Cedex ; France, vol. RAN WGI, No. Beijing, China; Apr. 12, 2010, Apr. 6, 2010, XP050419318, [retrieved on Apr. 6, 2010].
International Search Report and Written Opinion—PCT/US2012/035283-ISA/EPO—Jun. 28, 2012.
NTT Docomo: "Interference Coordination for Non-CA-based Heterogeneous Networks", 3GPP Draft; R1-102307 ICIC for Non-CA Hetnet, 3rd Generation Partnership Project (3GPP), Mobile Competence Centre ; 650, Route Des Lucioles ; F-06921 Sophia-Antipolis Cedex ; France, vol. RAN WG1, No. Beijing, China; Apr. 12, 2010, Apr. 7, 2010, XP050419698, [retrieved on Apr. 7, 2010].
Philips: "CQI/PMI reference measurement periods", 3GPP Draft; R1-082528, 3rd Generation Partnership Project (3GPP), Mobile Competence Centre ; 650, Route Des Lucioles ; F-06921 Sophia-Antipolis Cedex ; France, vol. RAN WGI, No. Warsaw, Poland; Jun. 25, 2008, XP050110793, [retrieved on Jun. 25, 2008].
Sawahashi M., et al., "Coordinated multi point transmission/reception techniques for LTE-advanced [Coordinated and Distributed MIMO]" IEEE Wireless Communications, IEEE Service Center, Piscataway, NJ, US, vol. 17, No. 3, Jun. 1, 2010, pp. 26-34, XP011311805, ISSN: 1536-1284 p. 30, paragraph Uplink.
Intel Corporation (UK) Ltd, "Non-CA based PDCCH Interference Mitigation in LTE-A", 3GPP TSG RAN WG1 Meeting #61 R1-102814 Montreal, Canada, May 10-14, 2010.
Qualcomm Incorporated, "Enabling communication in harsh interference scenarios", 3GPP TSG-RAN WG1 #62bis R1-105693 Oct. 11-15, 2010 Xian, China.
Research in Motion et al: "On Downlink Single Cell MU-MIMO in LTE-A", 3GPP Draft; R1-094458(RIM-downlink Single Cell MU-MIMO in LTE-A), 3rd Generation Partnership Project (3GPP), Mobile Competence Centre ; 650, Route Des Lucioles ; F-06921 Sophia-Antipolis Cedex ; France, No. Jeju; Nov. 9, 2009, XP050388884, [retrieved on Nov. 3, 2009] p. 3.
Research in Motion, UK Limited, "On Downlink Single Cell MU-MIMO in LTE-A", 3GPP TSG RAN WG1 Meeting #59bis R1-100562, Valencia, Spain, Jan. 18-22, 2010.
Catt: "Analysis of Time-Partitioning Solution for Control Channel", 3GPP TSG RAN WG1 meeting #61bis, R1-103494, Dresden, Germany, Jun. 28-Jul. 2, 2010, pp. 1-3.
Huawei: "Enhanced ICIC and Resource-Specific CQI Measurement", 3GPP TSG RAN WG1 meeting #61bis, R1-103900, Dresden, Germany, Jun. 28-Jul. 2, 2010, pp. 1-6.
Khandekar A., "LTE-Advanced: Heterogeneous networks", Wireless Conference (EW), 2010 European, Apr. 12-15, 2010, pp. 978-982.
Nishio A, et al., "Adaptive Transmission Techniques for Control Signaling in 3G-LTE," Panasonic Technical Journal, ' vol. 55, No. 1, Apr. 2009, pp. 15-20.
Qualcomm Incorporated: "Data channel Icic and the benefits of possible extensions", 3GPP Draft; R1-103562 Data Channel ICIC and the Benefits of Possible Extensions, 3rd Generation Partnership Project (3GPP), Mobile Competence Centre; 650, Route Des Lucioles; F-06921 Sophia-Anti Polis Cedex; France, vol. Ran WG1, no. Dresden, Germany; Jun. 28-Jul. 2, 2010, XP050449060, pp. 1-5.

* cited by examiner

INTERFERENCE ESTIMATION USING DATA TRAFFIC POWER AND REFERENCE SIGNAL POWER

CROSS-REFERENCE TO RELATED APPLICATION

This application claims the benefit under 35 U.S.C. §119 (e) to U.S. Provisional Patent Application No. 61/480,288, filed on Apr. 28, 2011, in the names of MALLIK et al., the disclosure of which is expressly incorporated by reference herein in its entirety.

BACKGROUND

1. Field

Aspects of the present disclosure relate generally to wireless communication systems, and more particularly to estimating interference in wireless communication systems.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless communication technologies not only to meet the growing demand for mobile broadband access, but to advance and enhance the user experience with mobile communications.

SUMMARY

Interference on data tones is estimated by detecting data transmissions from interferers. If the pilot tones from the interferer collide with the pilot tones from the serving cell, the interferer is called a colliding interferer. If the pilot tones do not collide, the interferer is called a non-colliding interferer. An overall interference covariance matrix is estimated as a function of scalar traffic to pilot ratio (TPR) estimates of dominant colliding interferers, residual interference covariance estimates, and covariance of channel estimates of dominant colliding interferers. The interference estimates are refined as a function of reliability based on a ratio of power received from a serving cell and power received from a dominant interferer. The residual interference estimate includes the contribution from thermal noise and all interferers that are not dominant colliding interferers.

According to an aspect of the present disclosure, a method of wireless communication in a wireless network includes receiving by a user equipment (UE) pilot tones from a serving cell and pilot tones from at least one interferer. The pilot tones from the colliding interferers collide with the pilot tones from the serving cell. The method also includes generating a first traffic to pilot ratio (TPR) estimate of the colliding interferers. A second TPR estimate is generated based on the first TPR estimate and a ratio of received power of the serving cell to received power of the colliding interferers. An interference estimate is based on the second TPR estimate.

In another aspect, an apparatus for wireless communication includes means for receiving, by a user equipment (UE), pilot tones from a serving cell and pilot tones from at least one interferer. The pilot tones from the colliding interferers collide with the pilot tones from the serving cell. The apparatus also includes means for generating a first traffic to pilot ratio (TPR) estimate of the colliding interferers. The apparatus also has means for generating a second TPR estimate based on the first TPR estimate and a ratio of received power of the serving cell to received power of the colliding interferers. The apparatus also includes means for computing an interference estimate based on the second TPR estimate.

In still another aspect, a computer program product for wireless communications has a non-transitory computer-readable medium having program code recorded thereon. The program code includes program code to receive, by a user equipment (UE), pilot tones from a serving cell and pilot tones from at least one interferer. The pilot tones from the colliding interferers collide with the pilot tones from the serving cell. The program code also includes program code to generate a first traffic to pilot ratio (TPR) estimate of the colliding interferers. Also, program code generates a second TPR estimate based on the first TPR estimate and a ratio of received power of the serving cell to received power of the colliding interferers. The program code further includes program code to compute an interference estimate based on the second TPR estimate.

In a further aspect, an apparatus for wireless communications has a memory, and at least one processor coupled to the memory. The processor(s) is configured to receive, by a user equipment (UE), pilot tones from a serving cell and pilot tones from at least one interferer. The pilot tones from the interferers collide with the pilot tones from the serving cell. The processor(s) is also configured to generate a first traffic to pilot ratio (TPR) estimate of the colliding interferers and to generate a second TPR estimate. The second TPR estimate is based on the first TPR estimate and a ratio of received power of the serving cell to received power of the colliding interferers. According to this aspect of the disclosure, the processor is further configured to compute an interference estimate based on the second TPR estimate.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
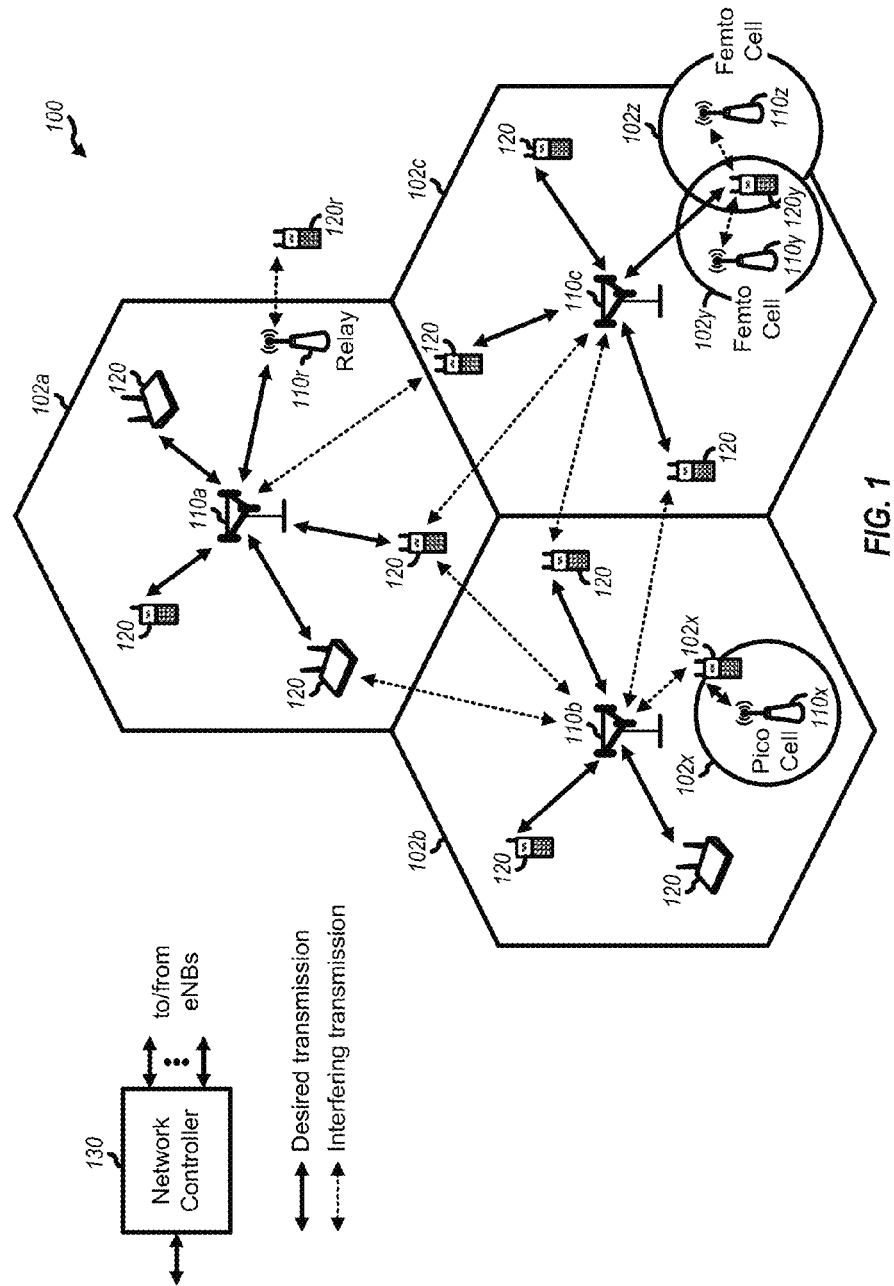
FIG. 1 is a block diagram conceptually illustrating an example of a telecommunications system.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

FIG. 1 shows a wireless communication network 100, which may be an LTE-A network. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. And, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for either synchronous or asynchronous operations.

In one aspect, the wireless network 100 may support Frequency Division Duplex (FDD) or Time Division Duplex (TDD) modes of operation. The techniques described herein may be used for either FDD or TDD mode of operation.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, a tablet, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.25, 2.5, 5, 10 or 20 MHz, respectively.

Figure 2:
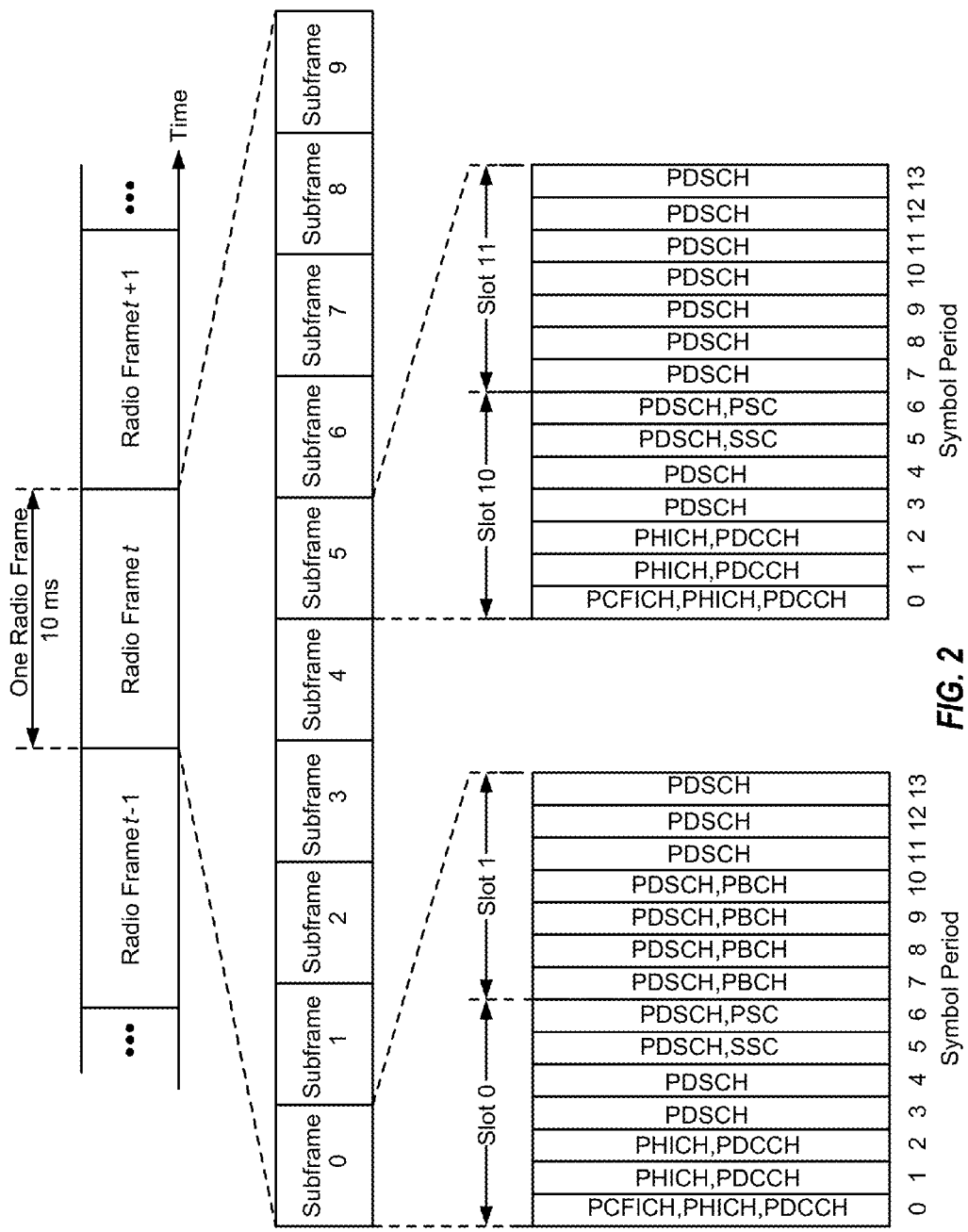
FIG. 2 is a diagram conceptually illustrating an example of a downlink frame structure in a telecommunications system.

FIG. 2 shows a downlink FDD frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
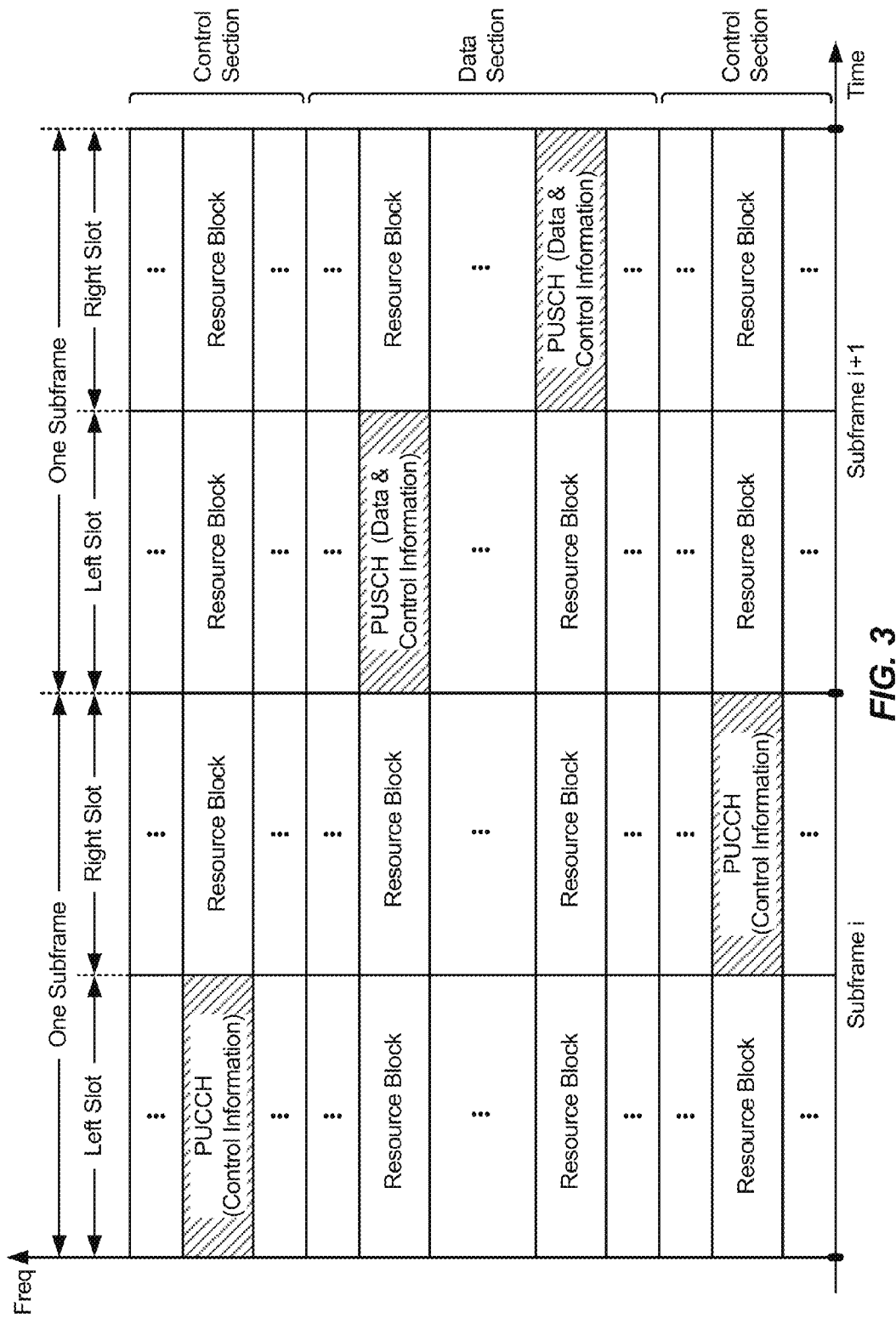
FIG. 3 is a block diagram conceptually illustrating an example frame structure in uplink communications.

FIG. 3 is a block diagram conceptually illustrating an exemplary FDD and TDD (non-special subframe only) subframe structure in uplink long term evolution (LTE) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNode B. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the UL resources. For example, a control and a data channel, parallel control channels, and parallel data channels may be transmitted by a UE.

Figure 4:
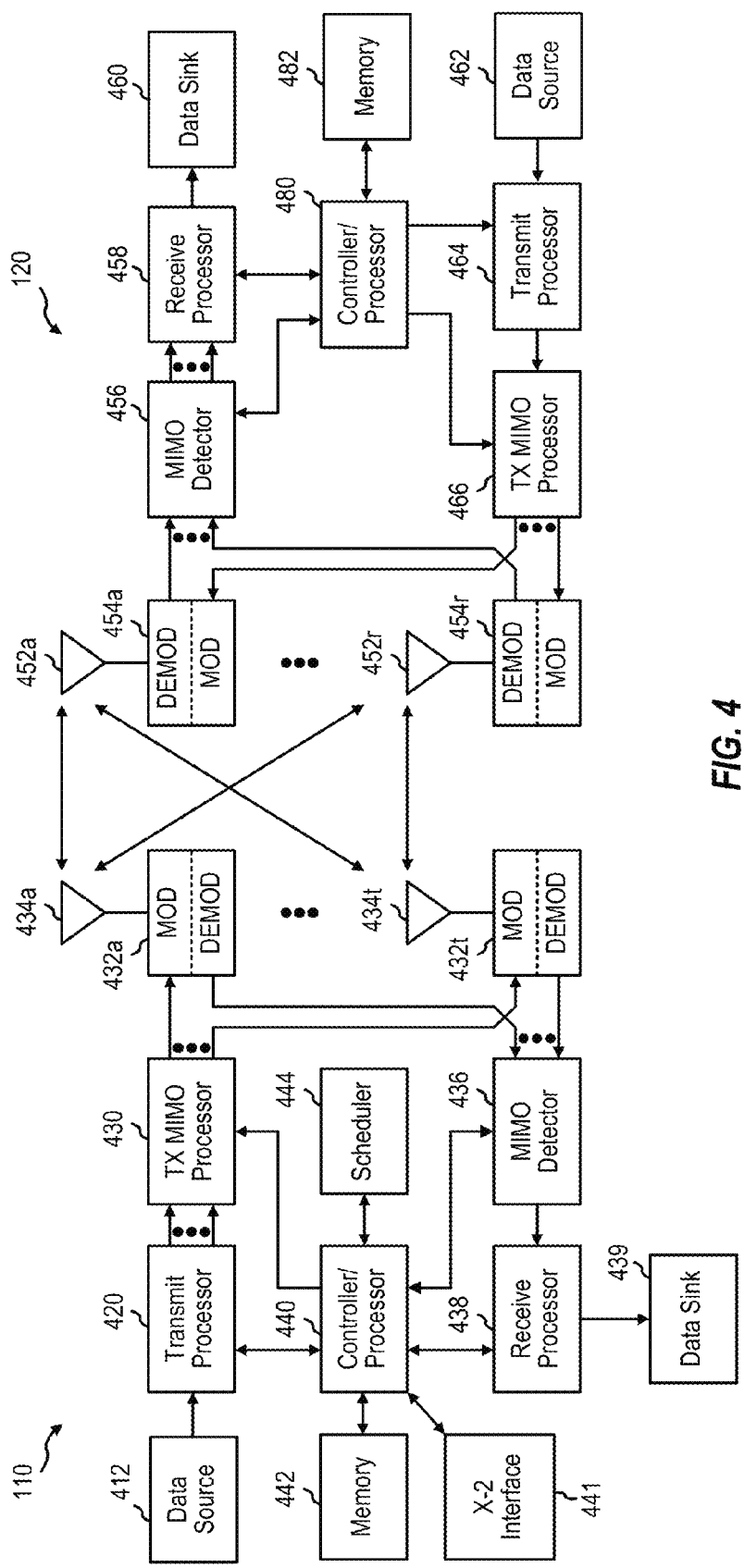
FIG. 4 is a block diagram conceptually illustrating a design of a base station/eNodeB and a UE configured according to one aspect of the present disclosure.

FIG. 4 shows a block diagram of a design of a base station/eNodeB 110 and a UE 120, which may be one of the base stations/eNodeBs and one of the UEs in FIG. 1. The base station 110 may be the macro eNodeB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440. The base station 110 can send messages to other base stations, for example, over an X2 interface 441.

The controllers/processors 440 and 480 may direct the operation at the base station 110 and the UE 120, respectively. The processor 440 and/or other processors and modules at the base station 110 may perform or direct the execution of various processes for the techniques described herein. The processor 480 and/or other processors and modules at the UE 120 may also perform or direct the execution of the functional blocks illustrated in use FIGS. 6-7, and/or other processes for the techniques described herein. The memories 442 and 482 may store data and program codes for the base station 110 and the UE 120, respectively. A scheduler 444 may schedule UEs for data transmission on the downlink and/or uplink.

Figure 5:
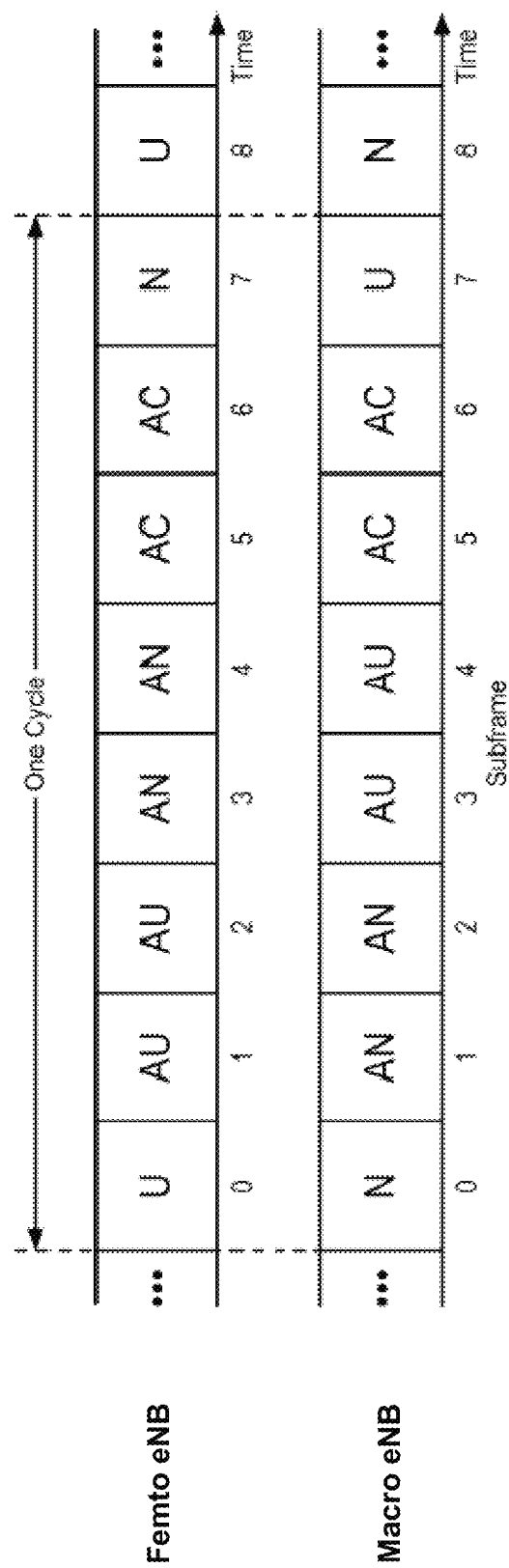
FIG. 5 is a block diagram conceptually illustrating adaptive resource partitioning in a heterogeneous network according to one aspect of the disclosure.

FIG. 5 is a block diagram illustrating TDM partitioning in a heterogeneous network according to one aspect of the disclosure. A first row of blocks illustrate sub frame assignments for a femto eNodeB, and a second row of blocks illustrate sub frame assignments for a macro eNodeB. Each of the eNodeBs has a static protected sub frame during which the other eNodeB has a static prohibited sub frame. For example, the femto eNodeB has a protected sub frame (U sub frame) in sub frame 0 corresponding to a prohibited sub frame (N sub frame) in sub frame 0. Likewise, the macro eNodeB has a protected sub frame (U sub frame) in sub frame 7 corresponding to a prohibited sub frame (N sub frame) in sub frame 7. Sub frames 1-6 are dynamically assigned as either protected sub frames (AU), prohibited sub frames (AN), and common sub frames (AC). During the dynamically assigned common sub frames (AC) in sub frames 5 and 6, both the femto eNodeB and the macro eNodeB may transmit data.

Protected sub frames (such as U/AU sub frames) have reduced interference and a high channel quality because aggressor eNodeBs are prohibited from transmitting. Prohibited sub frames (such as N/AN sub frames) have no data transmission to allow victim eNodeBs to transmit data with low interference levels. Common sub frames (such as C/AC sub frames) have a channel quality dependent on the number of neighbor eNodeBs transmitting data. For example, if neighbor eNodeBs are transmitting data on the common sub frames, the channel quality of the common sub frames may be lower than the protected sub frames. Channel quality on common sub frames may also be lower for extended boundary area (EBA) UEs strongly affected by aggressor eNodeBs. An EBA UE may belong to a first eNodeB but also be located in the coverage area of a second eNodeB. For example, a UE communicating with a macro eNodeB that is near the range limit of a femto eNodeB coverage is an EBA UE.

Another example interference management scheme that may be employed in LTE/-A is the slowly-adaptive interference management. Using this approach to interference management, resources are negotiated and allocated over time scales that are much larger than the scheduling intervals. The goal of the scheme is to find a combination of transmit powers for all of the transmitting eNodeBs and UEs over all of the time or frequency resources that maximizes the total utility of the network. "Utility" may be defined as a function of user data rates, delays of quality of service (QoS) flows, and fairness metrics. Such an algorithm can be computed by a central entity that has access to all of the information used for solving the optimization and has control over all of the transmitting entities, such as, for example, the network controller 130 (FIG. 1). This central entity may not always be practical or even desirable. Therefore, in alternative aspects a distributed algorithm may be used that makes resource usage decisions based on the channel information from a certain set of nodes. Thus, the slowly-adaptive interference algorithm may be deployed either using a central entity or by distributing the algorithm over various sets of nodes/entities in the network.

In deployments of heterogeneous networks, such as the wireless network 100, a UE may operate in a dominant interference scenario in which the UE may observe high interference from one or more interfering eNodeBs. A dominant interference scenario may occur due to restricted association. For example, in FIG. 1, the UE 120$y$ may be close to the femto eNodeB 110$y$ and may have high received power for the eNodeB 110$y$. However, the UE 120$y$ may not be able to access the femto eNodeB 110$y$ due to restricted association and may then connect to the macro eNodeB 110$c$ (as shown in FIG. 1) or to the femto eNodeB 110$z$ also with lower received power (not shown in FIG. 1). The UE 120$y$ may then observe high interference from the femto eNodeB 110$y$ on the downlink and may also cause high interference to the eNodeB 110$y$ on the uplink. Using coordinated interference management, the eNodeB 110$c$ and the femto eNodeB 110$y$ may communicate over the backhaul to negotiate resources. In the negotiation, the femto eNodeB 110$y$ agrees to cease transmission on one of its channel resources, such that the UE 120$y$ will not experience as much interference from the femto eNodeB 110$y$ as it communicates with the eNodeB 110$c$ over that same channel.

In addition to the discrepancies in signal power observed at the UEs in such a dominant interference scenario, timing delays of downlink signals may also be observed by the UEs, even in synchronous systems, because of the differing distances between the UEs and the multiple eNodeBs. The eNodeBs in a synchronous system are presumptively synchronized across the system. However, for example, considering a UE that is a distance of 5 km from the macro eNodeB, the propagation delay of any downlink signals received from that macro eNodeB would be delayed approximately 16.67 µs (5 km÷3×108, i.e., the speed of light, 'c'). Comparing that downlink signal from the macro eNodeB to the downlink signal from a much closer femto eNodeB, the timing difference could approach the level of a time-to-live (TTL) error.

Additionally, such timing difference may impact the interference cancellation at the UE. Interference cancellation often uses cross correlation properties between a combination of multiple versions of the same signal. By combining multiple copies of the same signal, interference may be more easily identified because, while there will likely be interference on each copy of the signal, it will likely not be in the same location. Using the cross correlation of the combined signals, the actual signal portion may be determined and distinguished from the interference, thus, allowing the interference to be canceled.

One technique that is used for interference management is referred to as common reference symbol (CRS) interference cancellation. Broadcast CRS tones can be measured and used to estimate interference on a channel so that the interference on the channel can be cancelled. CRS interference cancellation may be used for decoding downlink control and data channels (PDCCH/PDSCH). This allows accurate Radio Resource Management (RRM) measurements.

CRS interference cancellation may sometimes provide inaccurate interference estimates because interfering cells transmit CRS pilot tones whether or not they are transmitting data. The interference estimates are generally based on interference that is detected on the CRS pilot tones. However, in some situations, the interference estimates based on pilot tones could be quite different from interference that is actually present. For example, a UE that detects the pilot tone may estimate interference based upon an assumption that the interferer is transmitting data even when no data tone is actually being transmitted from the interferer. This incorrect assumption could cause the UE to overestimate the interference.

Partial loading and/or resource partitioning can also create mismatches between interference estimates that are based on a CRS pilot tone of an interfering signal resulting from data transmissions of the interferer. For example, a mismatch can occur if a cell ID combination of the serving cell and interfering cell result in a collision between CRS tones of the interferer and CRS tones of the serving cell, in situations when the UE has no information on whether the interferer is transmitting data (e.g. 'X' subframes in static resource partitioning information (SRPI) as discussed with respect to FIG. 5). In such situations, the interference estimate based on CRS tones may be very different from the true interference on data tones.

Differences between estimated interference and actual interference could have a large impact on link performance. Link performance conditions, such as throughput and frame error rate, for example, may be improved if the interference condition on data tones is known to the UE.

One approach to informing a UE of interference conditions on data tones involves signalling of neighbour cell loading status. However, even with such additional signalling, this approach still does not provide enough information to a UE when the interferer is partially loaded.

Another approach would be to use the UE reference symbol (UE-RS) tones for interference estimation. However, this can be applied only for certain unicast PDSCH transmissions having a UE-RS and cannot be applied to PDSCH transmissions without a UE-RS.

Figure 6:
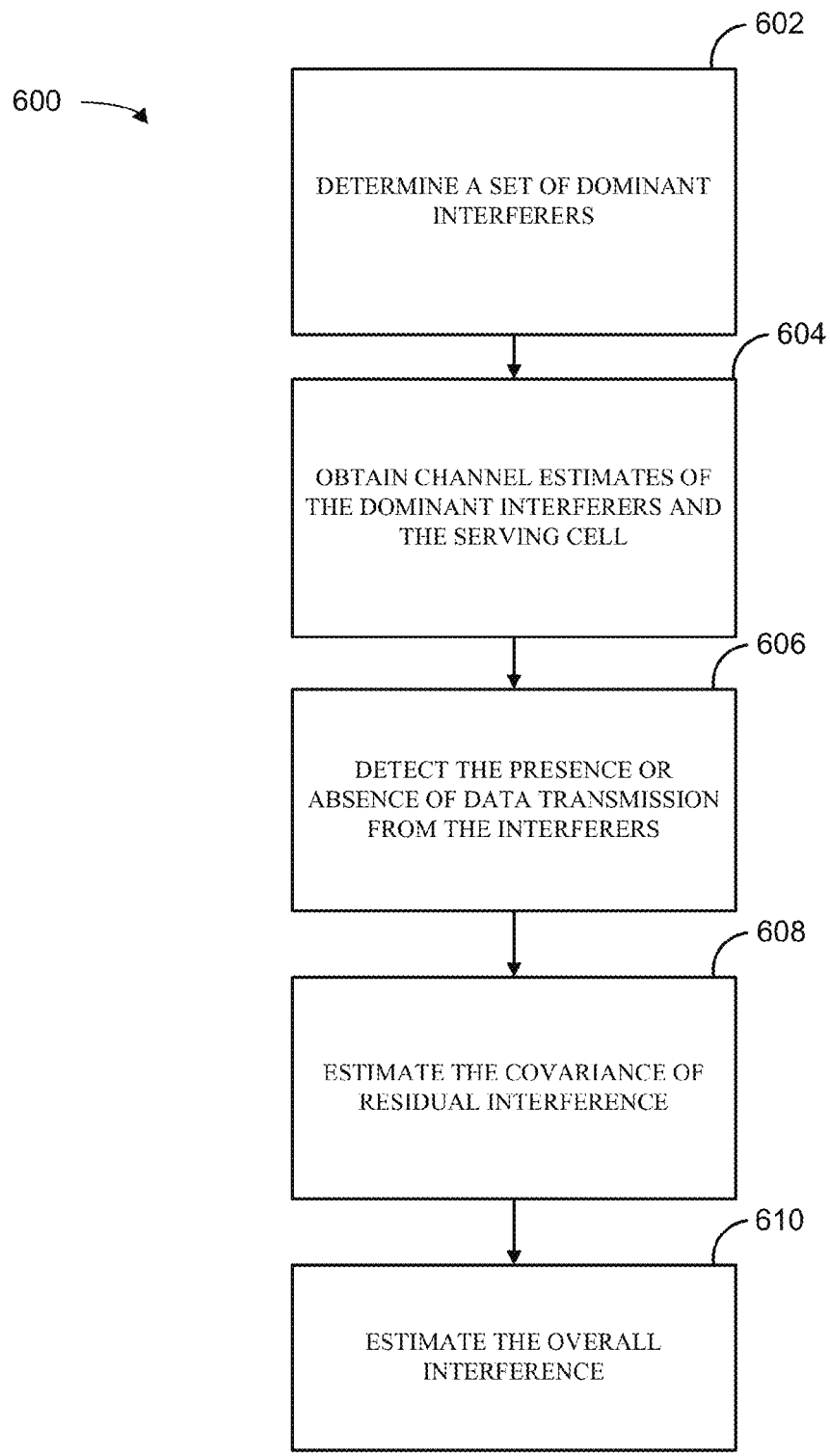
FIG. 6 is a block diagram illustrating a method for estimating interference in accordance with one aspect of the present disclosure.

One aspects of the present disclosure, which is described with reference to FIG. 6, includes a method 600 to estimate the interference by taking into account that certain interferers may not be transmitting data. According to this method, a UE attempts to determine whether interferers whose pilot tones have been detected are presently transmitting data. To make this determination, the UE compares the total power on the data tones with the power the UE sees on the pilot tones from the interferers. The method includes determining a set of dominant interferers whose pilots collide with a pilot of the serving cell in block 602 and obtaining channel estimates of these dominant interferers and the serving cell in block 604.

In block 606, the presence or absence of data transmission from interferers is detected using the total received power on data tones and the norm of the channel estimates of the serving cell and dominant interferers. Alternatively, the UE may use the received power on candidate demodulation resource symbol (DM-RS)/UE-RS sequences of dominant interferers to detect the presence or absence of data transmissions from interferers. More generally the traffic to pilot ratio (TPR) of the interferers is estimated.

The TPR represents a ratio of powers at which the transmitted data (traffic) is divided by the power at which the pilot tones are transmitted. A TPR of 0 indicates a pilot tone with no corresponding data transmission, for example. A TPR of 1 indicates data is transmitted with the same power as the pilot tone. A TPR, which is a scalar quantity, can be estimated for individual interferers or collectively for a set of interferers.

In block 608, the covariance of the residual interference seen on the pilot tones is estimated. This estimate of the residual interference seen on pilot tones excludes the interference from the dominant colliding interferers whose channels were already estimated.

In block 610, the overall interference covariance matrix is estimated as a function of the residual interference, the (scalar) TPR estimates of interferers, and covariance of the channel estimates of the dominant interferers. Here, the overall interference matrix is the sum of two parts. The first part represents the residual interference. The second part represents a scaled version of the covariance of the channel estimate of the dominant interferers. The scaling is determined by the TPR estimate of the interferer.

The methods to estimate interference according to aspects of the present disclosure provide several advantages over current techniques. For example, aspects of the present disclosure correctly estimate interference in partial loading scenarios in which an interferer does not send data on all resource blocks (RBs) in a subframe. In such situations the UE may perform an RB by RB estimate to generate a more accurate estimate, for example. Aspects of the present disclosure may also correctly estimate interference in a heterogeneous network scenario on 'X' subframes. Also, in situations such as in heterogeneous network scenario when a UE may not be aware of whether an interferer is sending data, the UE may detect the presence of an interferer and may still be able to generate a correct interference estimate.

Figure 7:
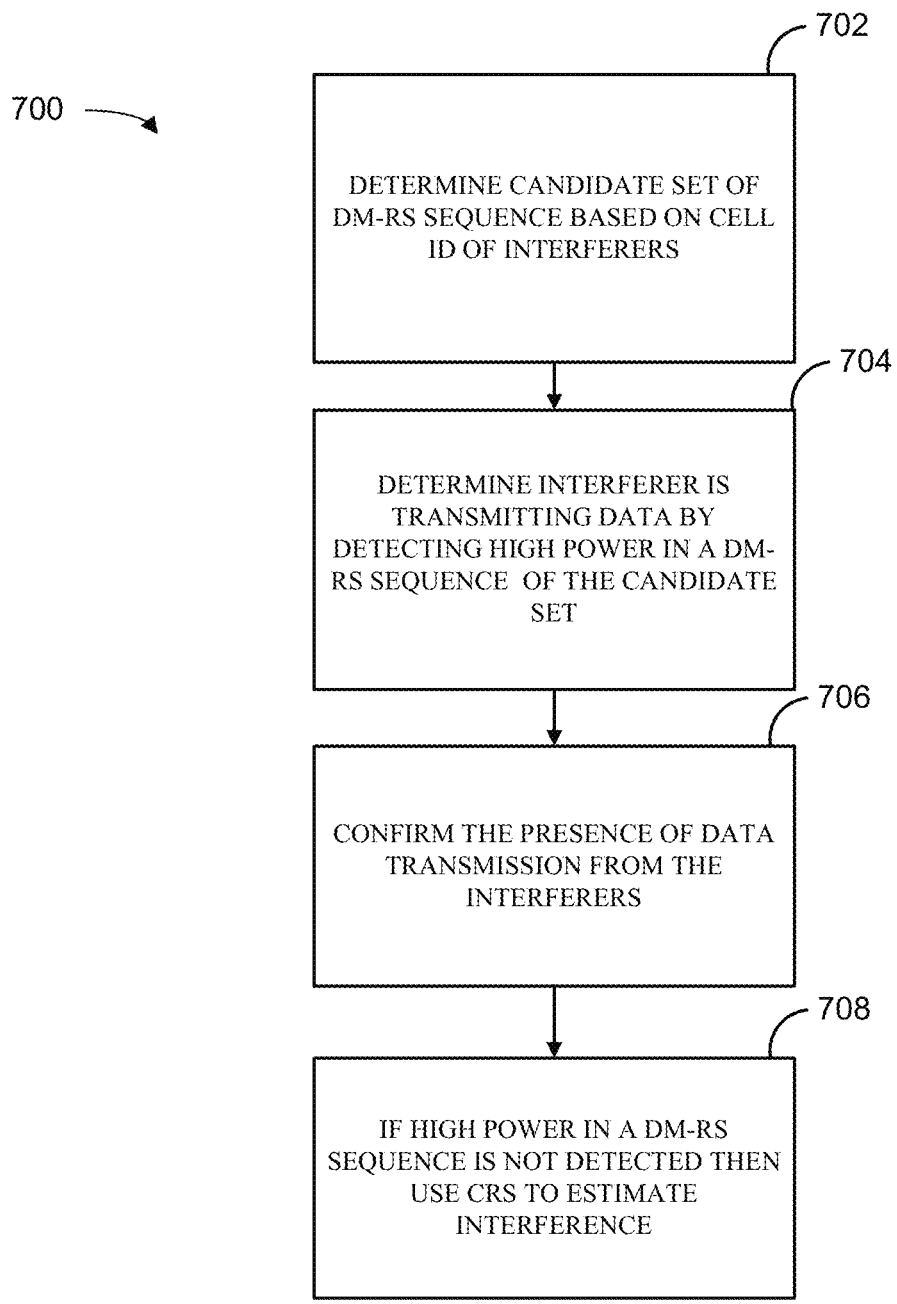
FIG. 7 is a block diagram illustrating a method for estimating interference in accordance with one aspect of the present disclosure.

The alternative method 700 of detecting the presence or absence of data transmissions from interferers (block 606, FIG. 6) using DM-RS transmissions of dominant interferers is described in more detail with reference to FIG. 7. According to standards, DM-RS has a fixed location and its scrambling code is a function of cell ID and a scrambling code identifier (SCID). DM-RS is utilized to determine whether there is data transmission from an interfering cell.

A DM-RS is transmitted by an interferer only if the interferer is sending data. Further, a candidate set of DM-RS sequences is known to the UE because the set of DM-RS sequences that may be transmitted by the interferer is a function of the cell ID of the interferer. Therefore, in block 702, a UE may follow multiple hypotheses as to whether a particular interferer is presently transmitting data and whether it is using a particular DM-RS sequence. In block 704, if the UE detects a large amount of energy on any of the DM-RS sequences that fits its hypothesis, then the UE can assume the DM-RS sequences belong to a particular interferer presently transmitting data in block 706.

Detection of a DM-RS sequence of an interferer confirms that there is data transmission on the interferer. However, an interferer could still be transmitting data without utilizing a DM-RS sequence. Therefore, a lack of detected DM-RS sequence does not confirm the interferer is silent. According to aspects of the present disclosure, if a DM-RS sequence is not detected, then the UE detect the interferer with CRS transmissions of the interferer and estimates the TPR of the interferer in block 708. Interferers with a TPR estimated via DM-RS, need not be considered for TPR estimation via CRS. TPR estimates based upon DM-RS may be used to improve TPR estimates based upon CRS transmissions of interferers.

Aspects of the present disclosure provide numerous techniques for estimating TPR when the TPR of multiple interferers are to be estimated using total received power on data tones and the power of CRS transmissions of the interferers. According to one aspect of the present disclosure, a single TPR value that applies for all the interferers may be estimated. This technique may be suboptimal in some circumstances but works well when a single interferer dominates, for example.

According to another aspect of the present disclosure, interferers may be partitioned such that interferers with similar spatial interference structure are in the same partition. In this case, a single TPR for each partition may be estimated. According to another aspect of the present disclosure, iterative approaches may be also be used. For example, initially it may be assumed that all interferers have an initial TPR estimate of 1 (or 0, or a fraction between 0 and 1). Then, the TPR of one interferer may be iteratively estimated assuming the other TPRs are exactly known. In other words, when multiple interferers are presently transmitting data, a UE may first assume that the weaker interferers are present. The UE may then only try to estimate the TPR of the stronger interferers. Based on the estimate of the stronger interferers, the UE may decide to perform further iterations to estimate the TPR of progressively weaker interferers, and thereby test the initial assumption that particular weaker interferers are present.

Certain aspects of the disclosure may provide improved granularity of the TPR estimate, i.e., the number of TPR estimates that are computed on a given subframe. In one example, one TPR estimate may be computed for each resource block (RB), the minimum unit of resource allocation to a UE. In one aspect, the granularity can be varied so that one TPR estimate can be computed over multiple resource blocks. This could be beneficial if it is known that interference does not vary too much across RBs, for example. In another example, two TPR estimates may be computed for each RB. In another example, one single TPR estimate may be computed for the two RBs in a subframe. This could be beneficial for subframes carrying relay backhaul traffic from the donor eNB, as the first and second slots within the same subframe can have different characteristics. Similarly, within an RB, a different TPR estimate may be generated for every tone or set of tones (e.g., resource element group (REG)), for example.

According to another aspect of the present disclosure, the quality of the TPR estimate can be further improved by quantization. It is generally known with a very high probability that a TPR estimate should fall within a certain range. For example, the TPR is known to be a non-negative real number that is generally between the values of 0.5 and 2 (i.e. −6 dB to 3 dB).

According to an aspect of the present disclosure, a quantization rule is designed to leverage the above observations. Because of the known range, quantization rules can be implemented to automatically change TPR estimates that fall outside of a predetermined range. For example, if a TPR estimate is less than 0.1, it can be quantized to a value of zero. Similarly, if the TPR estimate is very high, then it could be quantized to a more nominal value.

Figure 8:
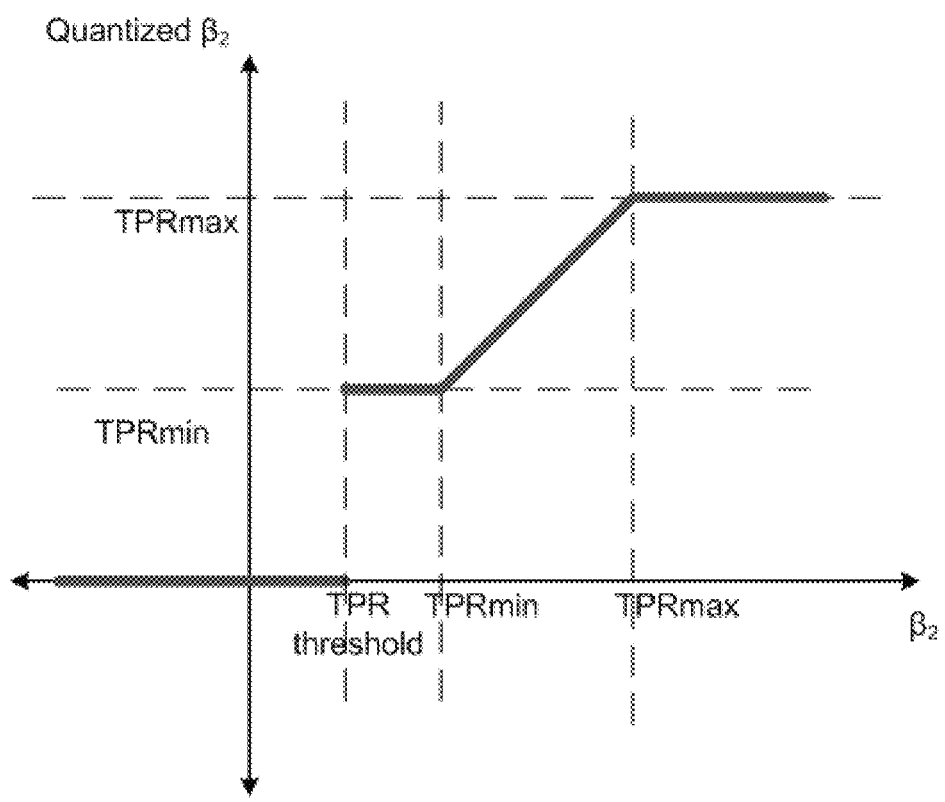
FIG. 8 is a graph conceptually illustrating quantization of a traffic to pilot ratio according to one aspect of the present disclosure.

A method of quantizing a TPR estimate according to an illustrative aspect of the present disclosure is described with reference to FIG. 8. A range of estimated TPR values that may be input to the quantization process is shown on the horizontal axis labeled '$\beta 2$'. A range of quantized TPR values that result from the quantization process are shown on the vertical axis labeled 'Quantized $\beta 2$'. Three predetermined parameters, TPRmax, TPRmin and TPR threshold are also used in the quantization process.

According to the illustrated quantization process, if the estimated TPR ($\beta 2$) is less than TPR threshold then the quantized estimate (Quantized $\beta 2$) is set to zero. If the estimated TPR ($\beta 2$) is greater than TPRmax then the quantized estimate (Quantized $\beta 2$) is set to TPRmax. If the estimated TPR ($\beta 2$) exceeds TPR threshold but is less than TPRmin, then the quantized estimate (Quantized $\beta 2$) is set to TPRmin. If none of these conditions are satisfied by the estimated TPR ($\beta 2$), then it is left unchanged and the quantized estimate (Quantized $\beta 2$) equals the estimated TPR ($\beta 2$).

In one embodiment of the present disclosure, the three predetermined parameters TPRmin, TPRmax and TPR threshold in the quantization process may be set as follows: If an interferer TPR is known then TPRmin and TPRmax are set to this known value of the interferer TPR. In this case TPR threshold is set to 0.3 times the known interferer TPR. In an alternative embodiment these parameters may be further improved by setting them as a function of the pre-interference cancellation (IC) signal to noise ratio (SNR) of the serving cell and dominant interferer, for example. If the serving cell TPR is unknown then TPRmin may be set to −9 dB, TPRmax may be set to 6 dB and TPR threshold may be set to −9 dB. Of course such values are merely exemplary and could be configured differently, when appropriate.

According to another embodiment of the present disclosure, a TPR estimate may be automatically changed to a default value of 1 if the dominant interferer is very weak compared to the serving cell. In this case the TPR estimate is known to be unreliable so a default value of 1 can be assigned. That is, if a UE determines that a TPR estimate is not reliable because the dominant interferer is very weak, the UE nonetheless assumes that the interferer is present. This aspect of the disclosure is compatible with the behavior of existing UEs that assume that an interferer is present whenever they detect its pilot tone.

According to the aspects of the present disclosure, a threshold for deciding to use the default TPR value of 1 could be based on pre-interference cancellation (pre-IC) RS power estimates of the serving cell and the interferer. In one example, the default TPR is used when the interferer power estimate is less than the pre-IC RS power estimate of the serving cell. In another example, the ratio of the RS power of the strongest interferer to the serving cell is computed and the default TPR estimate of 1 is forced if the computed ratio falls below a certain threshold.

In another example, the threshold for deciding to use the default TPR value of 1 could be based on quantities that are function of the post RS-IC channel estimates, such as wideband reference signal received power (RSRP) estimates. In yet another example, power estimates of more than one interferer can be used to decide whether to use the default TPR value.

According to one aspect of the present disclosure, the TPR estimate is refined in accordance with its reliability. The ratio (r) of received power of a serving cell and received power of a dominant interferer is indicative of reliability of the initial TPR estimate. A composite TPR estimate is generated based on an initial TPR estimate times a scaling function f(r) plus a second function g(r). The scaling function f(r) increases with r and g(r) decreases with r.

Figure 9:
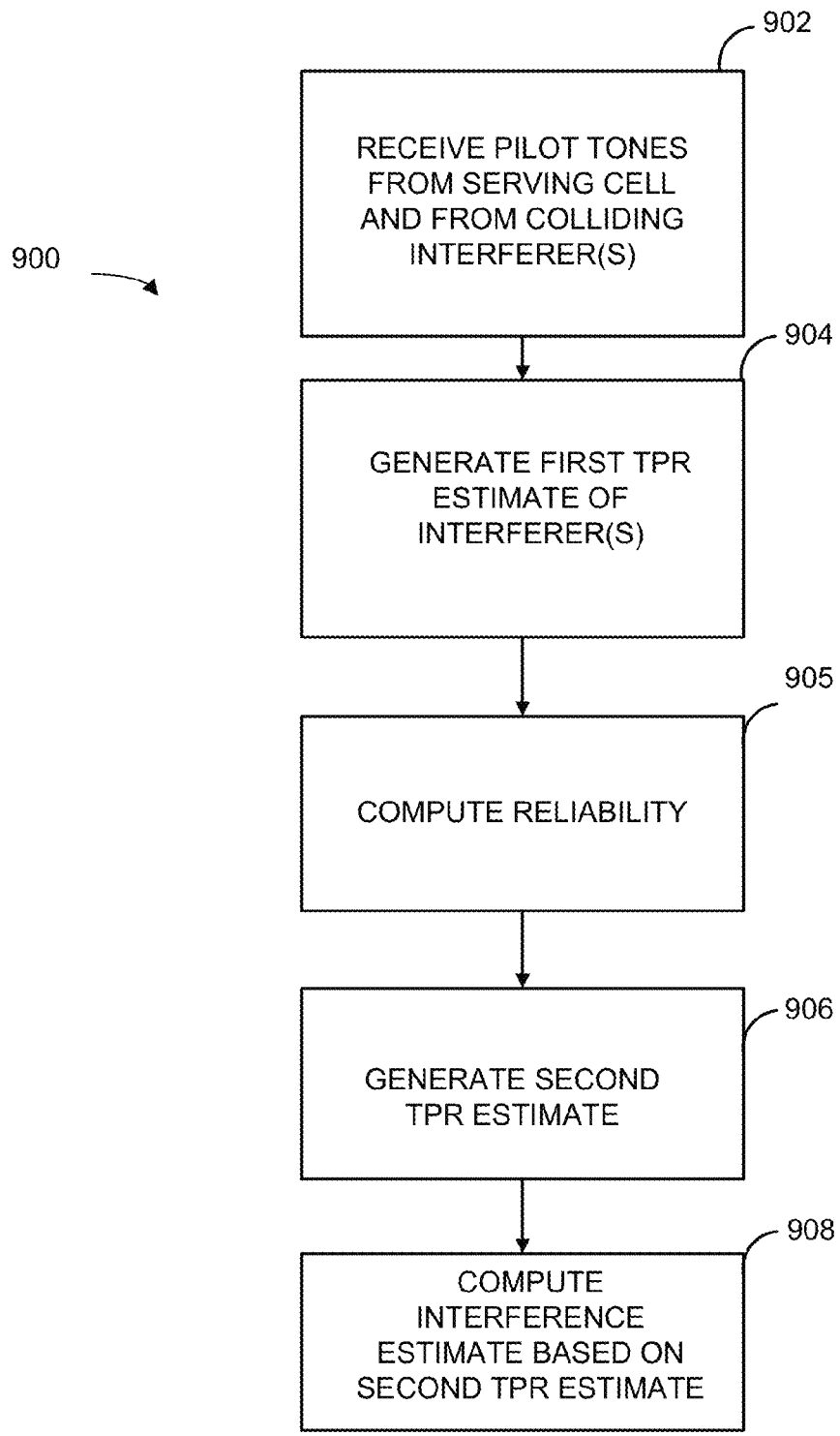
FIG. 9 is a block diagram illustrating a method for refining an interference estimate in accordance with one aspect of the present disclosure.

Referring to FIG. 9, an exemplary method 900 is described for estimating interference on data tones in a wireless communication system. The method includes a user equipment (UE) receiving pilot tones from a serving cell and receiving pilot tones from at least one interferer in block 902. The pilot tones from the colliding interferer(s) collide with the pilot tones from the serving cell. The method also includes generating a first traffic to pilot ratio (TPR) estimate of these colliding interferer(s) in block 904. The first TPR estimate can be generated in a number of ways as described above. At block 905, a reliability of the first TPR estimate is computed, for example as a function of received power of the serving cell and received power of at least one interferer colliding with the pilot tones of the serving cell. At block 906 a second TPR estimate of the interferer(s) is generated. A TPR estimate may be computed individually for each dominant colliding interferer, or a single TPR may be computed that applies to all dominant colliding interferers. More generally, the set of dominant colliding interferers may be partitioned into non-overlapping subsets and a TPR estimate may be computed for each subset of dominant colliding interferers. The second TPR estimate for a dominant interferer is based on the first TPR estimate and a ratio (r) of received power of the serving cell to the received power of the interferer(s). The ratio (r) is indicative of the reliability of the first TPR estimate. A large value of the ratio indicates a low reliability, whereas a small value of the ratio indicates a high reliability. An interference estimate is computed based on the second TPR estimate in block 908.

According to an aspect of the present disclosure, the second TPR estimate is a composite TPR estimate (TPRb) obtained as:

$$TPRb = TPRa * f(r) + g(r),$$

where r is the ratio of received power of the serving cell to received power of the dominant colliding interferer;
TPRa is the first TPR estimate, which is obtained by one of the techniques described above;
f(r) is a decreasing function of r; and
g(r) is an increasing function of r.

According to an aspect of the disclosure, the function f(r) is a scaling factor that is multiplied by the first TPR estimate (TPRa). As reliability of TPRa increases, i.e., the ratio (r) decreases, the function f(r) increases toward unity and the function g(r) decreases toward zero. Therefore, as the reliability of TPRa increases with decreasing ratio (r), the value of the second TPR estimate (TPRb) approaches or equals the value of TPRa. As the ratio (r) increases indicating decreasing reliability of TPRa, the function f(r) decreases toward zero, thereby giving less weight to TPRa. Also, as the ratio (r) increases, the value g(r) increases and approaches a default TPR value of TPRb. According to one aspect of the present disclosure, the default value of TPRb is set to 1 when TPRa is unreliable by allowing g(r) to approach or equal 1 and f(r) to approach or equal 0 as ratio (r) increases beyond a predetermined threshold.

According to an aspect of the disclosure, in one example, f(r)=1 if r<10 dB and f(r)=0 otherwise. In this example, g(r)=0 if ratio (r)<10 dB and g(r)=1 otherwise. In another example according to this aspect of the disclosure, f(r)=1 if ratio (r)<10 dB and f(r)=0 otherwise. In this second example, g(r)=0 if ratio (r)<10 dB; g(r)=0.75 if 10 dB<=g(r)<=13 dB; and g(r)=1 otherwise. Although these examples describe both f(r) and g(r) as being step functions, it should be understood that the functions f(r) and g(r) can be various different types of functions selected to generate a second TPR estimate (TPRb) based on the value and reliability of the first TPR estimate (TPRa). For example, f(r) and/or g(r) could be linear functions of ratio (r), logarithmic functions of ratio (r), and/or exponential functions of ratio (r) in which f(r) decreases with ratio (r) and g(r) increases with ratio (r).

Another aspect of the present disclosure provides an improved TPR estimate of an interferer by soft cancelling serving cell data. The present disclosure includes two schemes, a symbol level scheme and a codeword level scheme, to cancel out data from a serving cell and thereby obtain a more reliable estimate of the interferer.

According to the symbol level scheme, an estimate of the serving cell data is obtained by signal constellation demapping. This estimate is then subtracted out from the received data tones leading to a more accurate estimate of the interferer TPRs. If the serving cell is very strong as compared to the interferer, and if the precoding matrix used for data transmission is known, then it is possible to estimate the modulation order (i.e. 2 for QPSK, 4 for 16-QAM and 6 for 64-QAM) and also the modulation symbol used with a high degree of reliability on a per tone basis.

Soft symbol estimates that represent a weighted average of all modulation symbols in the modulation scheme may also be used in the symbol level scheme. The weights depend on the likelihood of the symbol being transmitted in a particular received signal vector.

In codeword level schemes, soft estimates of the modulation symbol used by a serving cell can be obtained from log likelihood ratios (LLRs) of the turbo decoder on a per tone basis. Here, the UE lets the decoder run a given noise estimate. The decoder may indicate with a good probability whether certain bits are zero or one. The decoder may also indicate the symbols to which these bits are mapped. According to this codeword level scheme, the soft estimates are subtracted out and a TPR estimate of the interferer can be computed.

Iterations between TPR estimates and soft symbol estimates can further improve performance because better TPR estimates improve the interference estimates. This, in turn, helps turbo decoding and results in a better soft symbol estimate which when subtracted leads to a better TPR estimate of the interferer.

In one configuration, the UE 120 is configured for wireless communication including means for estimating a TPR and means for computing an interference estimate. The estimating means and the computing means may include the controller processor 480 and memory 482 configured to perform the recited functions. The UE 120 is also configured to include a means for receiving transmissions. In one aspect, the receiving means may be the controller processor 480, memory 482, receive processor 458, demodulators 454*a-r* and antenna 452*a-r* configured to perform the functions recited by the receiving means. In another aspect, the aforementioned means may be a module or any apparatus configured to perform the functions recited by the aforementioned means.

Figure 10:
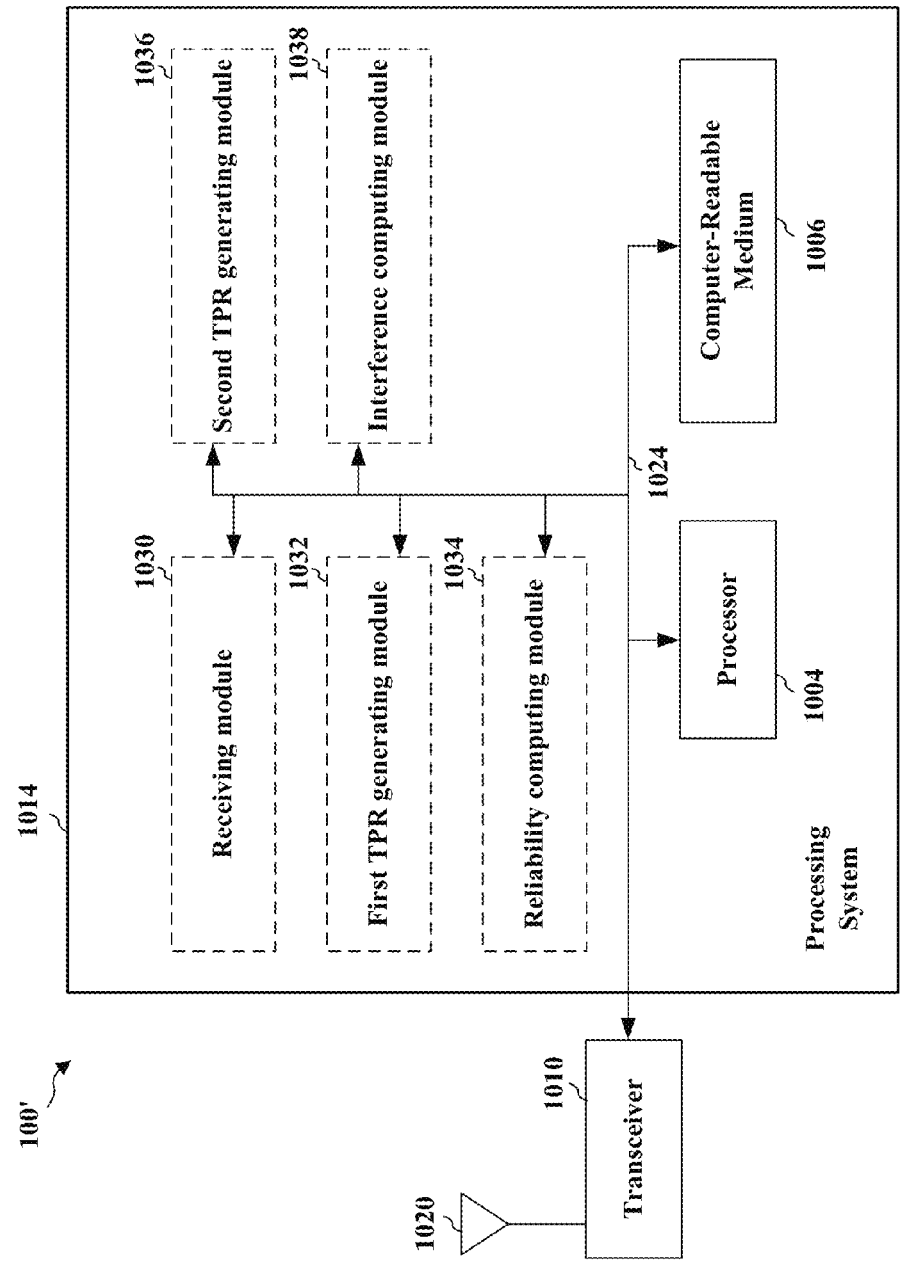
FIG. 10 is a conceptual data flow diagram illustrating the data flow between different modules/means/components in an exemplary apparatus.

FIG. 10 is a diagram illustrating an example of a hardware implementation for an apparatus 100' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware modules, represented by the processor 1004, the modules 1030-1038, and the computer-readable medium 1006. The bus 1024 may also link various other circuits such as timing sources, peripherals, voltage regulators, and power management circuits, which are well known in the art, and therefore, will not be described any further.

The apparatus includes a processing system 1014 coupled to a transceiver 1010. The transceiver 1010 is coupled to one or more antennas 1020. The transceiver 1010 provides a means for communicating with various other apparatus over a transmission medium. The processing system 1014 includes a processor 1004 coupled to a computer-readable medium 1006. The processor 1004 is responsible for general processing, including the execution of software stored on the computer-readable medium 1006. The software, when executed by the processor 1004, causes the processing system 1014 to perform the various functions described supra for any particular apparatus. The computer-readable medium 1006 may also be used for storing data that is manipulated by the processor 1004 when executing software. The processing system further includes modules 1030-1038. The receiving module 1030 can receive pilot tones from a serving cell and pilot tones from at least one interferer. The pilot tones from the at least one interferer collide with the pilot tones from the serving cell. The first traffic to pilot ratio (TPR) generating module 1032 generates TPR estimates of the at least one interferer. The reliability computing module 1034 computes a reliability of the first TPR estimate as a function of received power of the serving cell and received power of at least one interferer colliding with the pilot tones of the serving cell. The second TPR generating module 1036 generates a second TPR estimate based on the first TPR estimate and the reliability of the first TPR estimate. The interference computing module 1038 computes an interference estimate based on the second TPR estimate.

The modules may be software modules running in the processor 1004, resident/stored in the computer readable medium 1006, one or more hardware modules coupled to the processor 1004, or some combination thereof. The processing system 1014 may be a component of the UE 650 and may include the memory 660 and/or at least one of the TX processor 668, the RX processor 656, and the controller/processor 659.

In one configuration, the apparatus 100/100' for wireless communication includes means for receiving by a user equipment (UE) pilot tones from a serving cell and pilot tones from at least one interferer, which collide with the pilot tones from the serving cell. The apparatus also includes means for generating a first traffic to pilot ratio (TPR) estimate of the at least one interferer and means for computing a reliability of the first TPR estimate as a function of the received power of the serving cell and the received power of the colliding interferer(s). The apparatus also includes means for generating a second TPR estimate based on the first TPR estimate and the reliability of the first TPR estimate, and means for computing an interference estimate based on the second TPR estimate.

According to aspects of the present disclosure, the apparatus 100/100' also includes means for generating the second TPR estimate by adjusting the first TPR estimate by a function of the reliability of the first TPR estimate, means for computing the ratio (r) as a ratio of the received power of the serving cell and the received power of a dominant colliding interferer, and means for performing the second TPR estimate by adjusting the first TPR estimate by a first function (f) of the ratio (r) and a second function (g) of the ratio (r). According to aspects of the disclosure, the apparatus 100/100' also includes means for performing the second TPR estimate by multiplying the first TPR estimate by the first function (f) of the ratio (r) to generate a product and adding the product to the second function (g) of the ratio (r).

The aforementioned means may be one or more of the aforementioned modules of the apparatus 100 and/or the processing system 1014 of the apparatus 100' configured to perform the functions recited by the aforementioned means. As described supra, the processing system 1014 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

In another configuration the UE 120 is configured for wireless communication including means for receiving pilot tones from a serving cell and pilot tones from at least one interferer, in which the pilot tones from the interferers collide with the pilot tones from the serving cell. The receiving means may include antennas 452, the MIMO detector 456 and the receive processor 458 configured to perform the recited function. The UE 120 is also configured to include means for generating a first traffic to pilot ratio (TPR) estimate of the colliding interferer and means for generating a second TPR estimate based on the first TPR estimate and a ratio of received power of the serving cell to received power of the colliding interferers. The means for generating the first TPR and second TPR may include the controller processor 480, and memory 482, for example. In this configuration, the UE also includes means for computing an interference estimate based on the second TPR estimate. The means for computing an interference estimate may also include the controller processor 480 and memory 482 configured to perform the recited function, for example.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of computing an interference estimate for wireless communication, comprising:
   receiving by a user equipment (UE) pilot tones from a serving cell and pilot tones from at least one interferer, where the pilot tones from the at least one interferer collide with the pilot tones from the serving cell;
   generating a first traffic to pilot ratio (TPR) estimate of the at least one interferer;
   computing a reliability of the first TPR estimate based on a received power of the serving cell and a received power of the at least one interferer;
   generating a second TPR estimate based on the first TPR estimate and the reliability of the first TPR estimate; and
   computing the interference estimate based on the second TPR estimate.

2. The method of claim 1, in which generating the second TPR comprises:
   determining the second TPR estimate by adjusting the first TPR estimate based on the reliability of the first TPR estimate; and
   computing a ratio (r), in which r is a ratio of the received power of the serving cell and the received power of a dominant colliding interferer.

3. The method of claim 2, in which the adjusting includes: modifying the first TPR estimate by a first function (f) of the ratio (r) and a second function (g) of the ratio (r).

4. The method of claim 3, in which modifying the first TPR estimate comprises:
   multiplying the first TPR estimate by the first function (f) of the ratio (r) to generate a product and adding the product to the second function (g) of the ratio (r).

5. The method of claim 4, in which the first function (f) decreases with a decrease in the reliability of the first TPR estimate, and the second function (g) increases with a decrease in the reliability of the first TPR estimate.

6. The method of claim 1, in which computing the interference estimate is based on the second TPR estimate of the at least one interferer and residual interference.

7. The method of claim 1, further comprising:
   quantizing the first TPR estimate according to predetermined parameters.

8. An apparatus for computing an interference estimate for wireless communication, comprising:
   means for receiving by a user equipment (UE) pilot tones from a serving cell and pilot tones from at least one interferer, the pilot tones from the at least one interferer colliding with the pilot tones from the serving cell;
   means for generating a first traffic to pilot ratio (TPR) estimate of the at least one interferer;
   means for computing a reliability of the first TPR estimate based on a received power of the serving cell and a received power of the at least one interferer;
   means for generating a second TPR estimate based on the first TPR estimate and the reliability of the first TPR estimate; and
   means for computing the interference estimate based on the second TPR estimate.

9. The apparatus of claim 8, in which the means for generating the second TPR comprises:
   generates the second TPR estimate by adjusting the first TPR estimate based on the reliability of the first TPR estimate; and
   computes a ratio (r), in which r is a ratio of the received power of the serving cell and the received power of a dominant colliding interferer.

10. The apparatus of claim 9,
    in which generating the second TPR estimate by includes adjusting the first TPR estimate by a first function (f) of the ratio (r) and a second function (g) of the ratio (r).

11. The apparatus of claim 10, in which adjusting the first TPR estimate includes:
    multiplying the first TPR estimate by the first function (f) of the ratio (r) to generate a product and adding the product to the second function (g) of the ratio (r).

12. A computer program product for computing an interference estimate for wireless communication in a wireless network, comprising:
    a non-transitory computer-readable medium having program code recorded thereon, the program code comprising:
       program code to receive by a user equipment (UE) pilot tones from a serving cell and pilot tones from at least one interferer, where the pilot tones from the at least one interferer collided with the pilot tones from the serving cell;
       program code to generate a first traffic to pilot ratio (TPR) estimate of the at least one interferer;
       program code to compute a reliability of the first TPR estimate based on a received power of the serving cell and a received power of the at least one interferer;
       program code to generate a second TPR estimate based on the first TPR estimate and the reliability of the first TPR estimate; and
       program code to compute the interference estimate based on the second TPR estimate.

13. The computer program product of claim 12, in which the program code to generate the second TPR estimate comprises:

program code to determine the second TPR estimate by adjusting the first TPR estimate based on the reliability of the first TPR estimate; and program code to compute a ratio (r), in which r is a ratio of the received power of the serving cell and the received power of a dominant colliding interferer.

14. The computer program product of claim 13, in which the adjusting comprises:

program code to modifying the first TPR estimate by a first function (f) of the ratio (r) and a second function (g) of the ratio (r).

15. The computer program product of claim 14, in which modifying comprises:

program code to multiply the first TPR estimate by the first function (f) of the ratio (r) to generate a product and adding the product to the second function (g) of the ratio (r).

16. A system for computing an interference estimate for wireless communication, comprising:

a memory; and at least one processor coupled to the memory, the at least one processor being configured:

to receive by a user equipment (UE) pilot tones from a serving cell and pilot tones from at least one interferer, where the pilot tones from the at least one interferer collide with the pilot tones from the serving cell;

to generate a first traffic to pilot ratio (TPR) estimate of the at least one interferer;

to compute a reliability of the first TPR estimate as a function of received power of the serving cell and a received power of the at least one interferer;

to generate a second TPR estimate based on the first TPR estimate and the reliability of the first TPR estimate; and to compute the interference estimate based on the second TPR estimate.

17. The system of claim 16, in which to generate the second TPR estimate the at least one processor is configured:

to determine the second TPR estimate by adjusting the first TPR estimate based on the reliability of the first TPR estimate; and to compute a ratio in which r is a ratio of the received power of the serving cell and the received power of a dominant colliding interferer.

18. The system of claim 17, in which the at least one processor is configured to adjust the first TPR estimate by modifying the first TPR estimate by a first function (f) of the ratio (r) and a second function (g) of the ratio (r).

19. The system of claim 18, in which the at least one processor is further configured to modify first TPR estimate by multiplying the first TPR estimate by the first function (f) of the ratio (r) to generate a product and adding the product to the second function (g) of the ratio (r).

* * * * *